(12) United States Patent
Li

(10) Patent No.: US 6,624,889 B1
(45) Date of Patent: Sep. 23, 2003

(54) CASCADED FILTER EMPLOYING AN AOTF AND NARROWBAND BIREFRINGENT FILTERS

(75) Inventor: Shifang Li, Pleasanton, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 10/135,256

(22) Filed: Apr. 29, 2002

(51) Int. Cl.[7] .............................. G01J 4/00; G01J 3/50; H04J 14/06; H04J 14/02; G02F 1/335

(52) U.S. Cl. ...................... 356/365; 356/364; 356/369; 359/122; 359/124; 359/127; 359/285; 359/308; 250/226; 250/339.07; 385/37; 385/7; 372/13

(58) Field of Search .................. 356/364, 365, 356/369; 359/122, 124, 285, 308; 250/226, 339.07; 385/37, 7; 372/13

(56) References Cited

U.S. PATENT DOCUMENTS

| 5,946,128 | A | | 8/1999 | Paek ........................... 359/305 |
| 6,330,254 | B1 | | 12/2001 | Hung .......................... 372/20 |
| 6,330,255 | B1 | | 12/2001 | Hung .......................... 372/20 |
| 6,341,021 | B1 | * | 1/2002 | Wilner et al. |
| 6,424,451 | B1 | * | 7/2002 | Chang |
| 6,519,060 | B1 | * | 2/2003 | Liu |
| 2001/0038729 | A1 | * | 11/2001 | Westbrook |
| 2002/0088929 | A1 | * | 7/2002 | Kittaka et al. |

FOREIGN PATENT DOCUMENTS

| JP | WO01/57487 A1 | 9/2001 |
| WO | WO01/84196 A1 | 8/2001 |

OTHER PUBLICATIONS

I.C. Chang, et al., "Acousto–Optic Tunable Filters for High Resolution Spectral Analysis", Proceedings of the SPIE, vol. 268, pp. 167–170 (Feb. 10–11, 1981).

D.P. Baldwin, et al., "High–Resolution Spectroscopy Using an Acousto–Optic Tunable Filter and a Fiber–Optic Fabry–Perot Interferometer", Applied Spectroscopy, vol. 50, No. 4, pp. 498–503 (Apr. 1996).

Wang, et al., "Optical Design of a Near–Infrared Birefringent Filter System and Measurement on Birefringence Index of Calcite", Proceedings of the SPIE, vol. 4093, pp. 481–489 (2000).

* cited by examiner

Primary Examiner—Frank G. Font
Assistant Examiner—Khaled Brown
(74) Attorney, Agent, or Firm—Lumen Intellectual Property Services, Inc.

(57) ABSTRACT

An optical channel monitor (OCM) or filter for analyzing an incident light carrying a number of narrow band signal channels such as WDM or DWDM channels. The OCM or filter use an acousto-optic tunable filter to receive and refract from an incident light a refracted light such that the refracted light contains a test channel with a center frequency $v_0$. A first birefringent element is provided for filtering from the refracted light a first polarized light and a second polarized light orthogonal to the first polarized light. The transmission curves are engineered such that the transmissions of the first and second polarized light are substantially equal at the center frequency $v_0$ of the test channel. The OCM or filter has a second birefringent element for filtering from the first polarized light a first polarized portion and a second polarized portion. The transmission curves of the second birefringent element are set such that the transmissions of the first and second polarized portions are substantially equal at a first offset $\delta_1 v$ from the center frequency $v_0$.

15 Claims, 5 Drawing Sheets

CASCADED FILTER EMPLOYING AN AOTF AND NARROWBAND BIREFRINGENT FILTERS

FIELD OF THE INVENTION

The present invention relates to a cascaded narrowband filter using an acousto-optic tunable filter (AOTF) for wide band discrimination and birefringent filters for narrow band discrimination.

BACKGROUND

Most of the optical channel monitor (OCM) use gratings as dispersion elements to separate the wavelengths of light contained in the optical beam being examined. An optical spectrum of the beam is usually obtained by mechanically rotating a grating such that light diffracted at various wavelength-dependent angles is incident on a photodetector. Others solution implement a photodetector array that is also called a spectrometer.

An alternative method to obtaining an optical spectrum relies on the use of an acousto-optic tunable filter (AOTF). An AOTF is controlled by a tunable RF source to adjust the refraction of light in accordance with wavelength. The AOTF has many advantages over gratings including scan speed and ability to be integrated into a small size package. Unfortunately, AOTFs are limited by their poor spectrum resolution and accuracy. For example, the typical resolution of current AOTFs is about 100 GHz (60 GHz at full-width half maximum FWHM) and the temperature shift is about 100 pm/° C. In monitoring optical telecommunication systems with channels defined in accordance with the wavelength division multiplexed (WDM) or dense wavelength division multiplexed (DWDM) standards such low resolution can be used for determining channel intensity only.

The prior art teaches several approaches to improving the resolution and accuracy of AOTFs. For example, Paek describes a grating assisted acousto-optic tunable filter (AOTF) and method in U.S. Pat. No. 5,946,128. The filter combines a diffraction grating with the AOTF for resolving channel crosstalk issues and to provide rapid tunability. In addition, the narrower bandwidth of Paek's filter permits a larger number of wavelength channels within the passband of an Erbium Doped Fiber Amplifier (EDFA).

In another approach, an AOTF is used in combination with a Fabry-Perot interferometer to achieve higher resolution spectroscopy. Corresponding teaching is provided, among other, by I. C. Chang, et al., "Acousto-Optic Tunable Filters for High Resolution Spectral Analysis", Proceedings of the SPIE, Vol. 268, pp. 167–70 (Feb. 10–11, 1981) and D. P. Baldwin, et al., "High-Resolution Spectroscopy Using an Acousto-Optic Tunable Filter and a Fiber-Optic Fabry-Perot Interferometer", Applied Spectroscopy, Vol. 50, No. 4, pp. 498–503 (April 1996).

U.S. Pat. Nos. 6,330,255 and 6,330,254 both to Hung teach an integrated optic device for optical wavelength selection which uses an AOTF as a broad band tunable filter and is followed by a narrowband tunable filter. Hung teaches that the narrow band tunable filter can incorporate a Mach-Zhender interferometer or other narrowband filters, including polarization-type filters. The system becomes complicated because two tunable filters are needed. Consequently, the wavelength and bandwidth measurement accuracy are sacrificed.

The prior art teaches the use of birefringent filters in a number of applications. For example, Jingshan Wang, et al. teach the use of a birefringent filter system in "Optical Design of a Near-Infrared Birefringent Filter System and Measurement on Birefringence Index of Calcite", Proceedings of the SPIE, Vol. 4093, pp. 481–489 (2000) to observe the solar spectrum. The system uses a pre-filter, an analyzer and the birefringent filter as a final narrowband filter. In WO 01/84196 Li teaches the use of a wavelength filter comprised of birefringent waveplates within an optical interleaver. Imaki Masao, et al. in WO 01/57487 also teach the use of a birefringent crystal as a wavelength filter for monitoring the wavelength of a laser beam. The wavelength detection circuit uses two photodetectors, one to sense the s-polarized light and the other to sense the p-polarized light.

Although the prior art teaches optical spectral analyzers and various wavelength filtering techniques, it does not provide a reliable, small and fast optical channel monitor (OCM), which can be used in wavelength monitoring applications. In particular, it would be an advance in the art to design an OCM that can be used in channel monitoring in optical fiber communication systems. It would be particularly advantageous to provide an optical channel monitor OCM that can measure a center frequency of a channel, its bandwidth and its intensity.

OBJECTS AND ADVANTAGES

In view of the above, it is an object of the present invention to provide a novel cascaded filter that can be used for wavelength monitoring. In particular, it is an object of the invention to provide an optical channel monitor employing such cascaded filter design for monitoring wavelength channels in communication systems by measuring their center frequencies, bandwidths and its intensity. These and other object and advantages will become apparent upon reading the detailed description.

SUMMARY OF THE INVENTION

The objects and advantages of the invention are achieved by an optical channel monitor (OCM) for analyzing an incident light carrying a number of narrow band signal channels. In general, the signal channels can represent any narrow portions of the spectral band spanned by the incident light. For example, the incident light can contain signal channels that are Wavelength Division Multiplexed (WDM) channels or Dense Wavelength Division Multiplexed (DWDM) channels in an optical communication network.

The OCM has an acousto-optic tunable filter (AOTF) for receiving the incident light and refracting from it a refracted light such that the refracted light contains one of the narrow band signal channels or a test channel with a center frequency $v_0$. A first birefringent element is provided for filtering from the refracted light a first polarized light and a second polarized light orthogonal to the first polarized light. The transmission curves for the first polarized light and of the second polarized light are generally periodic and out of phase with each other. The transmission for both first and second polarized light varies between a maximum and minimum transmission level. Therefore, the intensities of the first and second polarized light vary between corresponding maximum and minimum values. In accordance with the invention, the transmission curves are engineered such that the transmissions of the first and second polarized light are substantially equal at the center frequency $v_0$ of the test channel. In other words, the transmission curves have equal transmission values at the center frequency $v_0$.

The OCM has a second birefringent element for filtering from the first polarized light a first polarized portion and a second polarized portion. Once again, the first and second portions are orthogonal to each other. The transmission curves of the second birefringent element are set such that the transmissions of the first and second polarized portions are substantially equal at a first offset $\delta_1 v$ from the center frequency $v_0$. A set of photodetectors is used for measuring the intensities of the first polarized light and the intensities of the first and second filtered portions. An analysis unit, e.g., a processor-based computing unit, is connected to the photodetectors to derive from the intensities the center frequency $v_0$ and the bandwidth $\Delta v_0$ of the test channel.

The OCM uses polarization separators, e.g., polarization beam splitters or polarization walk-off elements, for separating and directing light based on its polarization. A first polarization separator is used for directing the first polarized light to the second birefringent element. A second polarization separator is placed after the second birefringent element for directing the first and second polarized portions to a first pair of photodetectors, i.e., first polarized portion to one and the second polarized portion to the other photodetector of the first pair.

In a preferred embodiment of the OCM a third birefringent element is provided for filtering from the second polarized light a third and a fourth polarized portion. The polarizations of these portions are orthogonal to each other. The third birefringent element is designed such that the transmissions of the first and fourth polarized-portions are substantially equal at a second offset $\delta_2 v$ from the center frequency $v_0$. A third polarization separator is provided in this embodiment for directing the third and fourth polarized portions to a second pair of photodetectors.

In another embodiment no third birefringent element is used. Instead, the first polarization separator directs the second polarized light to a single photodetector. In this embodiment less intensity data is provided from the photodetectors to the analysis unit for determining the center frequency $v_0$ and the bandwidth $\Delta v_0$ of the test channel.

The principles of the invention can be used in an optical filter for filtering a test channel from among WDM or DWMD channels. In some embodiments more than one signal channel can be contained in the refracted light. In those embodiments additional polarization separators and birefringent elements are required to analyze the center frequencies and bandwidths of the signal channels.

The design of the OCM or filter can include additional optics to focus and/or collimate the refracted light and/or the polarized portions at any step of the wavelength monitoring or filtering process. Any other elements required for stable operation, e.g., temperature control mechanisms to maintain the birefringent elements at a constant temperature, can be integrated into OCMs or filters in accordance with the invention. The details of the invention are discussed below with reference to the attached drawing figures.

DETAILED DESCRIPTION

Figure 1:
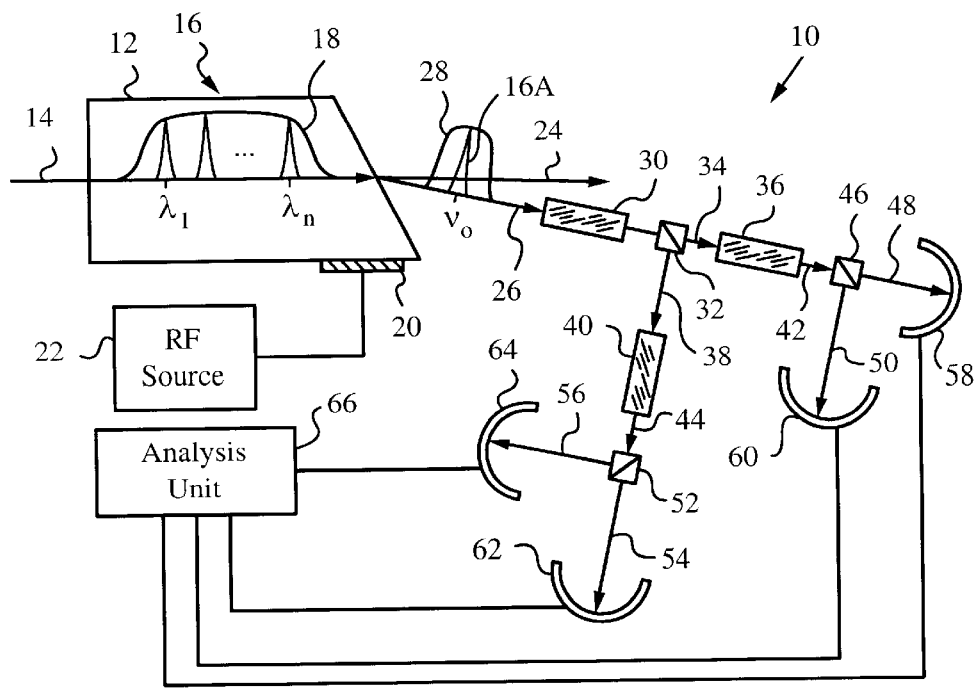
FIG. 1 shows a plan view of an optical channel monitor (OCM) in accordance with a preferred embodiment of the invention.

FIG. 1 illustrates a preferred embodiment of an optical channel monitor (OCM) 10. OCM 10 has an acousto-optic tunable filter (AOTF) 12 for receiving incident light 14 whose spectrum 18 is to be determined or monitored and whose polarization is preset.

For example, incident light 14 can be derived from a light source (not shown) to be tested or from an optical circuit. In the present embodiment, light 14 arrives from an optical communications network and contains a number of narrow band signal channels 16 within spectrum 18. Signal channels 16 can be defined in accordance with any format. For example, signal channels 16 can be Wavelength Division Multiplexed (WDM) channels or Dense Wavelength Division Multiplexed (DWDM) channels. The channel spacings and formats are defined by these multiplexing standards. Among other, these formats prescribe the width of spectrum 18 (e.g., the C-band for optical communications) as well as the center frequencies, channel spacings and channel bandwidths. A person skilled in the art will appreciate that, in general, signal channels 16 can represent any narrow portions of spectrum 18 spanned by incident light 14.

AOTF 12 has a transducer 20 controlled by a radiofrequency (RF) source 22. The frequency at which RF source 22 is set determines the frequency of acoustic waves applied to AOTF 12 by transducer 20. The acoustic waves applied to AOTF 12, in turn, set the wavelength-dependent refraction of light 14 in accordance with well-known principles. Specifically, when RF source 22 is turned on light 14 passes through AOTF 12 in the form of an unrefracted light 24 and a refracted light 26. Refracted light 26 spans a band 28 that is a subset of spectrum 18. In the present embodiment, band 28 contains one of signal channels 16 or a test channel 16A centered at a center frequency $v_0$ and having a bandwidth $\Delta v_0$ defined at Full-Width-Half-Maximum (FWHM) (also see FIG. 2).

A first birefringent element 30 is positioned in the path of refracted light 26. Birefringent element 30 is designed to filter from refracted light 26 a first polarized light 34 and a second polarized light 38. Specifically, birefringent element 30 supports the propagation of first polarized light 34 in an ordinary polarization or as an o-wave. Element 30 also supports the propagation of second polarization light 38 in an extraordinary polarization or as an e-wave. The o-wave is orthogonally polarized to the e-wave. Thus, first polarized light 34 is orthogonally polarized to second polarized light 38.

In OCM 10 birefringent element 30 preferably consists of two birefringent crystals of different thermal properties, e.g., a plate of $YVO_4$ and $TiO_2$, with the axis z of the crystal parallel to the face and 45° to the polarization direction of refracted light 26. Of course, other birefringent crystals such as KTP, KDP, $LiNbO_2$, calcite $PbMoO_3$ or other birefringent elements can be used as well. However, in order to minimize the size of OCM 10 it is preferable that birefringent element 30 exhibit a large birefringence index $\mu$. For more information on selection of birefringent materials and elements and general design of birefringent filters the reader is referred to Jingshan Wang, et al. who teach the use of a birefringent filter system in "Optical Design of a Near-Infrared Birefringent Filter System and Measurement on Birefringence Index of Calcite", Proceedings of the SPIE, Vol. 4093, pp. 481–489 (2000), M. Born and E. Wolf "Principles of Optics" and other open literature and textbooks.

The indices of refraction $n_o$ and $n_e$ experienced by the o-wave and e-wave differ by the birefringence index $\mu$. The birefringence index $\mu$ generally depends on wavelength $\lambda$ of refracted light 26 and temperature T of element 30 and can be expressed as:

$$\mu(\lambda,T)=n_e-n_o.$$

In accordance with well-known optics principles, the birefringence index $\mu$ and the length of element 30 introduce a retardation (phase difference) between the o-wave or light 34 and the e-wave or light 38. The interference between the o-wave and the e-wave, produces transmission curves, which determine the intensities of light 34, 38 transmitted by element 30. Specifically, the transmission of first polarized light 34 in the o-wave polarization exiting element 30 exhibits a periodic fluctuation between a maximum and a minimum. Likewise, the transmission of second polarized light 38 in the e-wave polarization exhibits a periodic fluctuation between a maximum and a minimum. In general, the transmission maxima and minima of light 34 and 38 are 180° out of phase. These well-known principles are employed in the present invention as described below.

Figure 2:
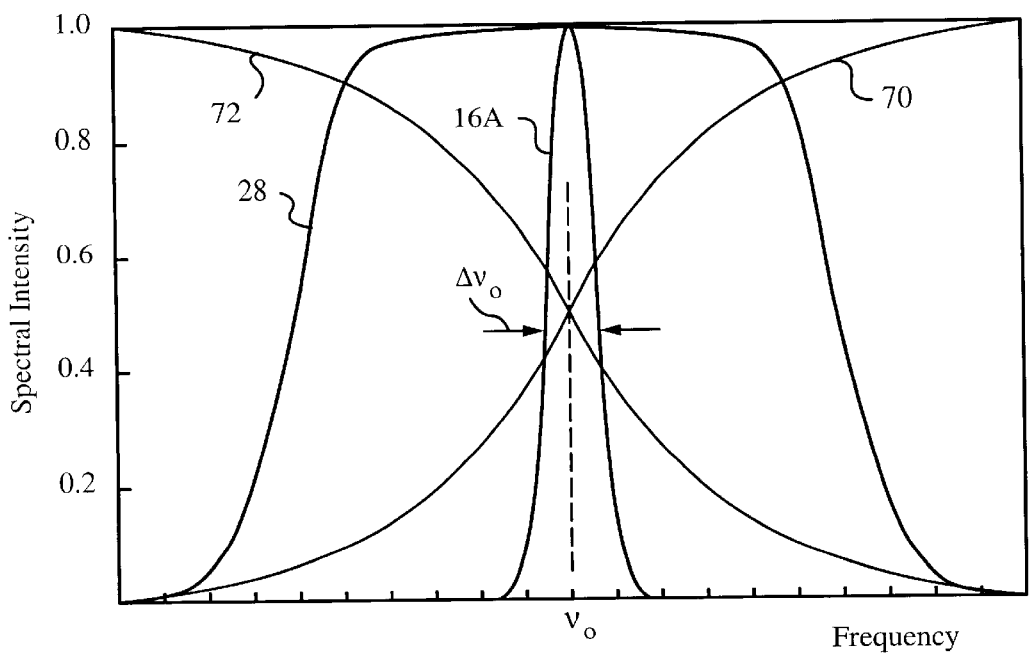
FIG. 2 is a graph illustrating in detail the spectrum of light refracted by an acousto-optic tunable filter belonging to the OCM in FIG. 1.

In particular, crystal 30 has a length selected to produce a transmission curve 70 for first polarized light 34 and a transmission curve 72 for second polarized light 38, as shown in FIG. 2. Transmission curves 70, 72 are periodic, i.e., they repeat outside the frequency range shown in the graph of FIG. 2, and they are 180° out of phase with each other. Furthermore, transmission curves 70, 72 for both first and second polarized light 34, 38 vary between a maximum value of 1 (complete transmission) and a minimum value of 0 (no transmission). Since transmission curves 70, 72 determine the intensities of transmitted polarized light 34, 38, respectively the intensities of polarized light 34, 38 can also vary between corresponding maximum and minimum values of 1 and 0. A person skilled in the art will realize that in practice these maximum and minimum values will differ slightly from the ideal values of 1 and 0.

In accordance with the invention, transmission curves 70, 72 are engineered by adjusting the length of crystal 30 for pre-selected crystals with birefringence index $\mu$ such that the intensities of first and second polarized light 34, 38 are substantially equal at the center frequency $v_0$ of the test channel. In other words, the transmission curves have almost equal and preferably equal transmission values at the center frequency $v_0$. In practice equal transmission values at center frequency $v_0$ may be difficult to maintain, since birefringence index $\mu$ varies with temperature as does the length of crystal 30. Therefore, it is preferred that crystal 30 be compensated for temperature variations by any suitable method. For example, a thermal crystal design, electronic temperature balance or thermo-electric elements can be used for compensation purposes.

A first polarization separator 32, in this embodiment a polarization beam splitter (PBS), is positioned in the path of polarized light 34, 38. It will be understood that any type of beam splitting device including beam splitter cubes, polarization walk-off elements, directional couplers and other fiber-based or free space devices can be used as polarization separator 32. PBS 32 separates and directs light based on its polarization. In the present embodiment, PBS 32 directs first polarized light 34 to a second birefringent element 36 and second polarized light 38 to a third birefringent element 40.

Figure 3:
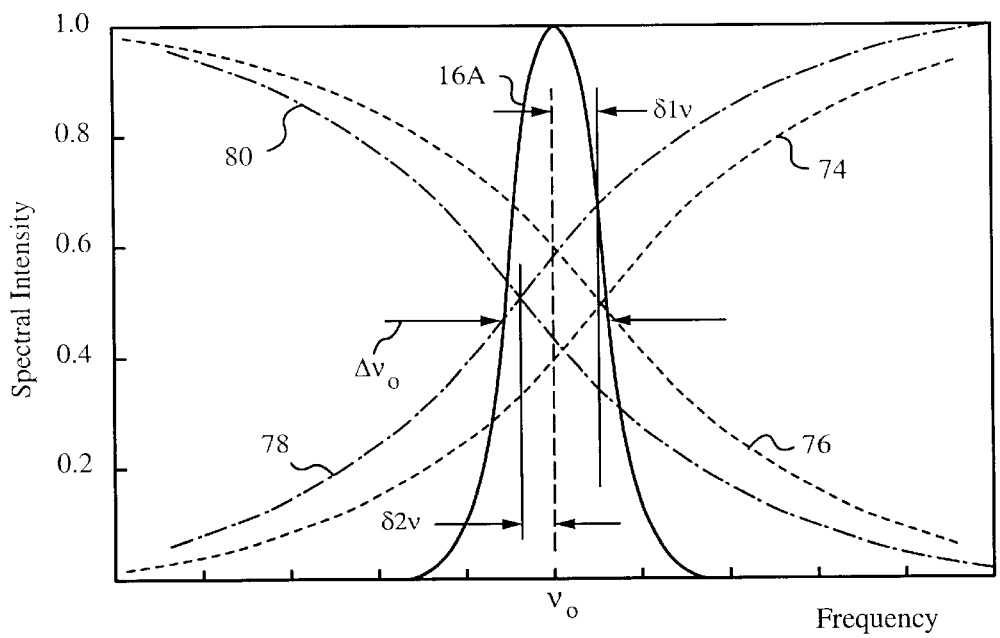
FIG. 3 is a graph illustrating the transmission curves of second and third birefringent elements of the OCM of FIG. 1.

Second birefringent element 36 is designed for filtering from first polarized light 34 a first polarized portion 48 and a second polarized portion 50 orthogonal to first polarized portion 48. The principles of operation of element 36 are the same as that of element 30. Element 36 is designed to produce a transmission curve 74 for first polarized portion 48 and a transmission curve 76 for second polarized portion 50, as shown in FIG. 3. In accordance with the invention, transmission curves 74, 76 of crystal 36 are set such that the transmissions of first and second polarized portions 48, 50 are substantially equal at a first offset $\delta_1 v$ from center frequency $v_0$.

Referring back to FIG. 1, a second polarization separator 46, in this embodiment also a PBS, is placed after element 36 for directing first and second polarized portions 48, 50 to a first pair of photodetectors 58, 60. First polarized portion 48 is directed to photodetector 58 and second polarized portion 50 is directed to photodetector 60. Photodetectors 58, 60 can be any suitable photodetecting devices such as charge-coupled devices, photomultipliers, phototransistors, photodiodes or other photosensitive electro-optic components.

Now, PBS 32 also directs second polarized light 38 to a third birefringent element 40. Element 40 is also a birefringent crystal engineered to filter from second polarized light 38 a third polarized portion 54 and a fourth polarized portion 56. Third and fourth polarized portions 54, 56 are orthogonal to each other. Crystal 40 is designed to have a transmission curve 78 for polarized portion 54 and a transmission curve 80 for polarized portion 56, as shown in FIG. 3. In accordance with the invention, transmission curves 78, 80 are designed such that the transmissions of third and fourth polarized portions 54, 56 are substantially equal at a second offset $\delta_2 v$ from center frequency $v_0$.

A third polarization separator 52 in the form of a PBS is provided for directing third and fourth polarized portions 54, 56 to a second pair of photodetectors 62, 64, respectively. Third polarized portion 54 is directed to photodetector 62 and third polarized portion 56 is directed to photodetector 64. Second pair of photodetectors 62, 64 along with first pair of photodetectors 58, 60 form a set of photodetectors for measuring intensities of first, second, third and fourth polarized portions 48, 50, 54, 56. It is convenient that all photodetectors 58, 60, 62, 64 in the set be of the same type and exhibit the same level of sensitivity.

The outputs of photodetectors 58, 60, 62 and 64 are connected to an analysis unit 66. Analysis unit 66 is preferably a device equipped with a processor, e.g., a digital signal processor (DSP) or other logic for receiving, comparing and analyzing the intensity levels obtained from photodetectors 58, 60, 62 and 64. Most preferably, unit 66 is a computer programmed to derive from the measured intensities center frequency $v_0$ and bandwidth $\Delta v_0$ of test channel 16A.

When OCM 10 is placed into operation, AOTF 12 receives light 14 from an optical communication network. Light 14 spans a spectrum 18 containing a number of signal channels 16 centered at wavelengths $\lambda_1, \lambda_2, \ldots \lambda_n$ or at corresponding center frequencies $v_1, v_2, \ldots v_n$. The frequency of RF source 22 is adjusted such that transducer 20 sets up an acoustic wave in AOTF 12 to refract light 26 spanning a band 28 of interest. AOTF 12 is a coarse but very fast wavelength selection device. Therefore, although AOTF 12 does not permit band 28 to be set sufficiently narrow to perform the desired monitoring functions on signal channels 16 formatted in accordance with WDM and especially in DWDM formats, it can be adjusted very rapidly with the aid of RF source 22 and transducer 20.

In the example shown, the wavelength of the acoustic wave in AOTF 12 is set to refract from light 14 band 28 containing one signal channel or test channel 16A centered at $v_0$. For example, test channel 16A can be a DWDM channel at center frequency $v_0$ of 193.1 THz in the C-band. FIG. 2 illustrates band 28 of refracted light 26 prior to entering birefringent element 30. Clearly, test channel 16A at $v_0$ is not sufficiently resolved by AOTF 12. That is because AOTF 12 exhibits approximately a Gaussian band pass T that can be expressed as a function of frequency v:

$$T_{AOTF}(v) = \exp^{-\frac{(v-v_0)^2}{\sigma^2}},$$

where $2\sqrt{\ln 2}\sigma$ is the full-width half-maximum (FWHM) line width of AOTF 12. Now, the FWHM of AOTF 12 is typically on the order of 60 GHz or 0.5 nm, which is insufficient to resolve test channel 16A.

Referring back to FIG. 1, refracted light 26 containing test channel 16A centered at $v_0$ passes through crystal 30 and is filtered into first and second polarized light 34, 38. PBS 32 separates and directs polarized light 34 to crystal 36 and orthogonally polarized light 38 to crystal 40. Crystal 36 filters light 34 to obtain polarized portions 48, 50. Meanwhile, crystal 40 filters light 38 to obtain polarized portions 54, 56. PBS 46 and PBS 52 send polarized portions 48, 50, 54, 56 to photodetectors 58, 60, 62, 64, respectively. Photodetectors 58, 60, 62, and 64 measure the intensities of polarized portions 48, 50, 54, 56 and send the results to unit 66.

Based on the intensity values obtained from photodetectors 58, 60, 62, 64 unit 66 first derives total intensity and center frequency $v_0$ of test channel 16A. The summation of the intensities detected by photodiode 58, 60, 62 and 64 give the total intensity of the test channel 16A. The processing performed in the derivation of center frequency $v_0$ will be best understood by referring to FIG. 2. Specifically, unit 66 determines the intensity of polarized light 34 by summing the measured intensities of polarized portions 48, 50. Then, unit 66 determines the intensity of polarized light 38 by summing the measured intensities of polarized portions 54, 56. Because transmission curves 70, 72 are engineered to be substantially equal, i.e., cross at center frequency $v_0$, the intensities of light 34 and 38 will be equal when the actual center frequency $v_0$ of test channel 16A coincides with the standard center frequency $v_0$. It will be appreciated that in practice deviations in the intensity values may be caused by thermal effects, despite the fact that test channel 16A is actually centered at the standard center frequency $v_0$. A person skilled in the art will understand how to employ standard electronic correction techniques as well as temperature control mechanisms as described above to compensate for these deviations.

In determining bandwidth $\Delta v_0$ of test channel 16A unit 66 has to determine the intensity values of individual polarized portions 48, 50, 54, 56. The processing performed in the derivation will be best understood by referring to FIG. 3. Specifically, the measurements of polarized portions 48, 50 yields two intensity values in accordance with the areas under transmission curves 74, 76 spanning the width of test channel 16A. Likewise, the measurement of polarized portions 54, 56 yields two intensity values in accordance with transmission curves 78, 80. Preferably, the intensity values obtained are all normalized to the total intensity.

Unit 66 thus has available four independent values of intensity from which it determines the parameters of test channel 16A, namely center frequency $v_0$, total intensity and bandwidth $\Delta v_0$. This is a case of three unknowns with four equations. These equations take advantage of the fact that the ratios of the two photodiode pairs are a function of linewidth because of the nonlinearity of curves 74, 76, 78 and 80. Such system can be solved in accordance with any known mathematical technique, e.g., linear algebra.

Figure 4:
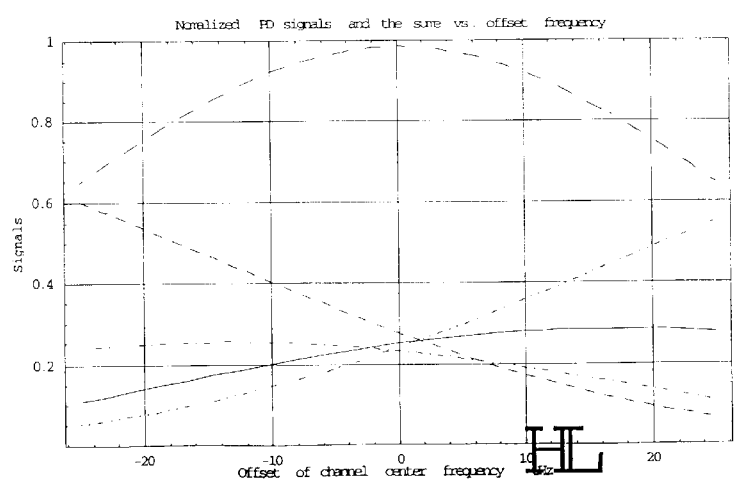
FIG. 4 is a plot illustrating the intensities measured by photodetectors of the OCM in FIG. 1.

In the present embodiment the intensities from photodetectors 58, 60, 62, 64 are calculated by unit 66 as a function of the parameters of test channel 16A. The results are plotted in FIGS. 4 and 5. FIG. 4 illustrates detected intensities as a function of center frequency $v_0$ of test channel 16A. The sum of all intensities yields the total intensity and is plotted as the top dashed curve that is determined by AOTF 12. Intensities obtained from individual photodetectors 58, 60, 62, 64 are normalized to the sum. The intensities are plotted as solid, dashed, dotted and double-dotted curves for photodetectors 58, 60, 62, 64 respectively. The sensitivity of the normalized intensity signals obtained in this embodiment with respect to center frequency $v_0$ was typically about 0.02/GHz. This means that a resolution of 1 GHz is easily achievable by OCM 10.

Figure 5:
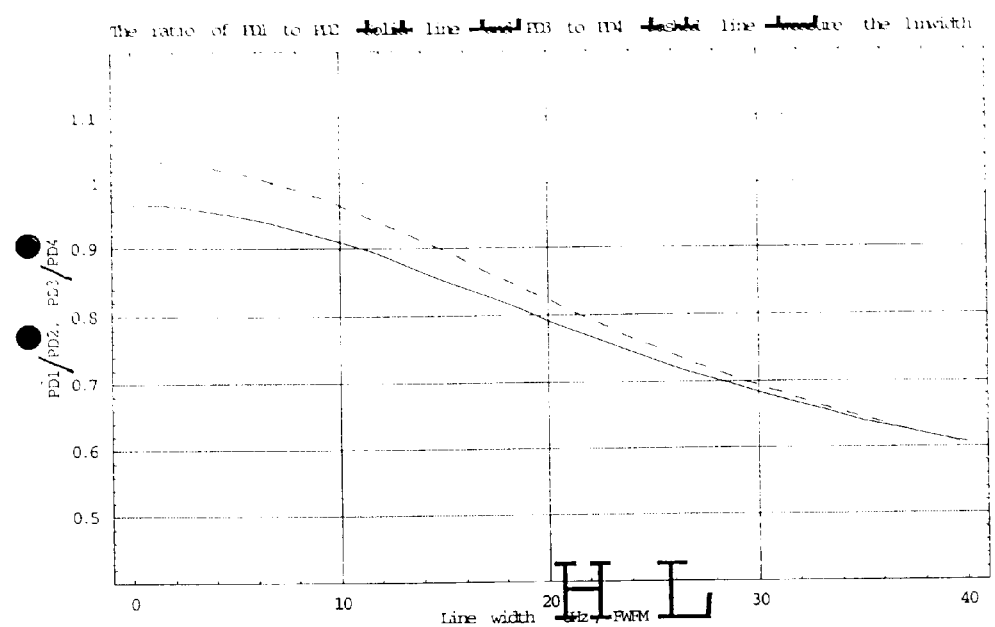
FIG. 5 is a plot illustrating how the bandwidth of the incident beam can be measured by ratios of the two pairs of photodetectors.

FIG. 5 is a plot of the ratios of intensities detected by photodetectors 58, 60, 62, 64 as a function of bandwidth $\Delta v_0$ of test channel 16A. The solid curve represents the ratio of intensities detected by photodetectors 58 and 60. The dashed curve represents the ratio of intensities detected by photodetectors 62 and 64. The sensitivity of the bandwidth $\Delta v_0$ measurement thus obtained is typically about 0.01/GHz. This means that a typical resolution of about 0.1 GHz is achievable by OCM 10.

OCM 10 has the advantage of offering high sensitivity because it detects and uses in its computation all signal intensities. Because the transmission curves described above are periodic, they can be set to cross at center frequencies of all signal channels 16 to be monitored. Hence, OCM 10 can be used to monitor center frequencies and bandwidths of all signal channels 16 using the same birefringent elements 30, 36 and 40. Only band 28 of AOTF 12 has to be adjusted to select any given signal channel 16 for monitoring. Such adjustment can be performed to very rapidly and allow for a monitoring rate of <1 μs per channel. Any drifts due to change in wavelength and temperature can be compensated for electronically or by appropriate thermal control mechanisms, as will be appreciated by a person skilled in the art.

The performance achieved by OCM 10 renders it suitable for use in monitoring signal channels 16 in WDM as well as DWDM applications. Furthermore, OCM 10 can be easily integrated into a small and inexpensive package. It should also be noted that OCM 10 can include additional optics such as lenses, fibers, and collimators as necessary for shaping the light of test channel 16A. In most general terms, OCM 10 can be used as an integrated channel filter and monitor.

Figure 6:
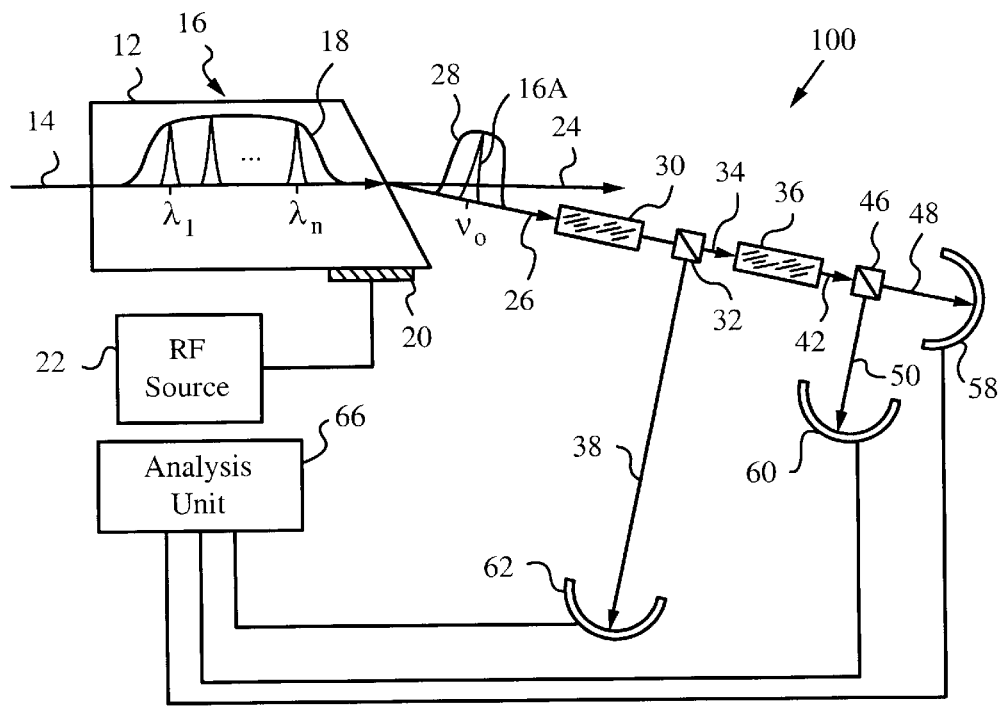
FIG. 6 shows a plan view of another OCM in accordance with the invention.

FIG. 6 illustrates an alternative embodiment of an OCM 100 that is similar to OCM 10 and designates corresponding parts by the same reference numerals. In fact, OCM 100 is analogous to OCM 10 with the exception that it has no third birefringent element 40 and PBS 52. Instead, PBS 32 directs second polarized light 38 directly to photodetector 62.

During operation OCM 100 receives three intensity values, namely the intensity of second polarized light 38, and the intensities of first portion 48 and second portion 50. Since these three values yield three equations, one can determine from them the parameters of test channel 16A, namely center frequency $v_0$, total intensity and bandwidth $\Delta v_0$. This is a case of three unknowns with three equations. Such system can be solved in accordance with any known mathematical technique, e.g., linear algebra.

Figure 7:
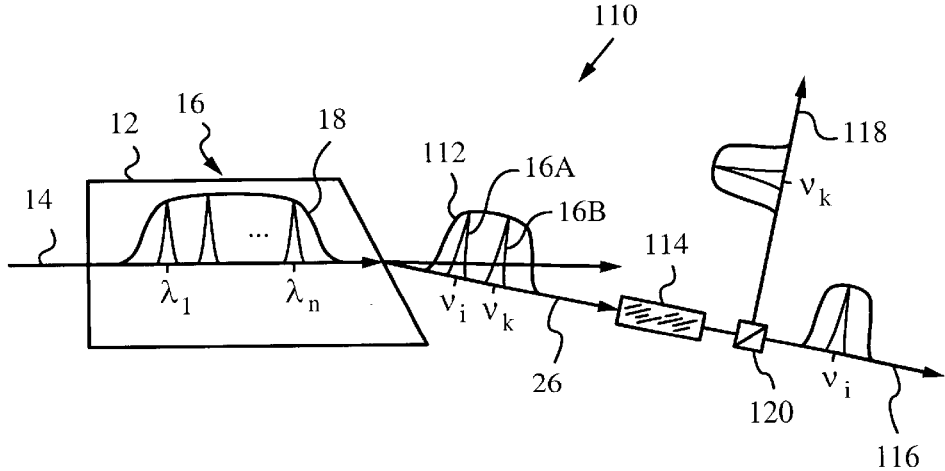
FIG. 7 shows a portion of another OCM or filter in accordance with the invention.
Figure 8:
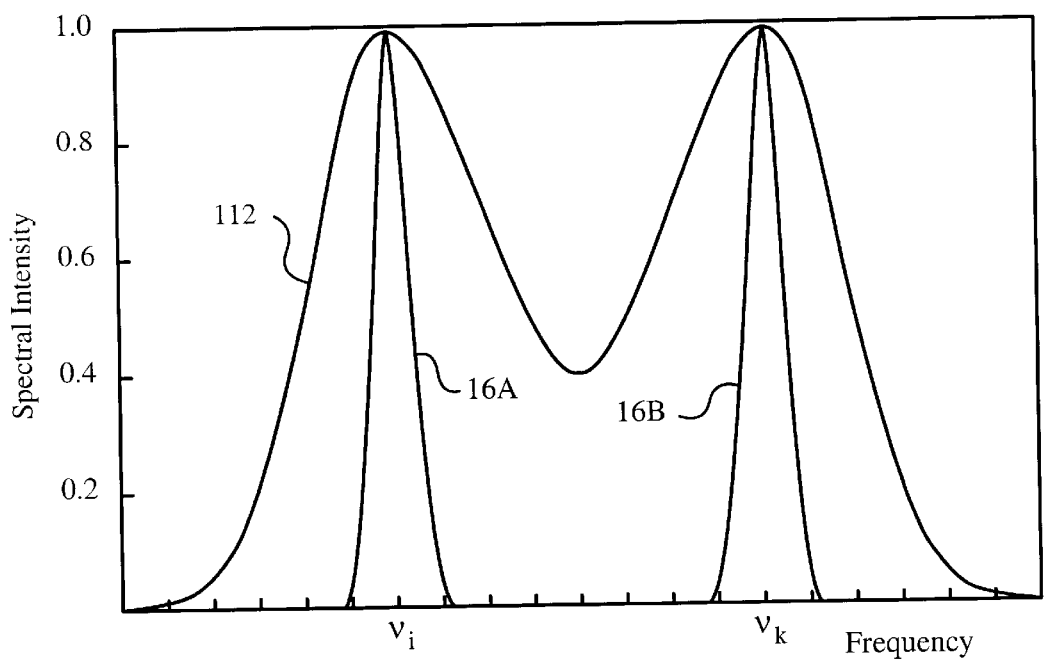
FIG. 8 is a graph illustrating the spectrum of light refracted by the AOTF of OCM or filter of FIG. 5.

FIG. 7 illustrates a portion of another embodiment of an OCM 110. Same reference numerals are used for parts corresponding to OCM 10. Here, AOTF 12 is set to refract in refracted light 26 a band 112 containing two adjacent test channels 16A, 16B. Band 112 is better illustrated in FIG. 8.

AOTF 12 does not have sufficient resolving power to resolve test channels 16A, 16B. Thus, a pre-filter 114 is used to separate test channels 16A, 16B. Pre-filter 114 is preferably a birefringent element designed to filter test channel 16A in a polarized beam 116 and to filter test channel 16B in an orthogonally polarized beam 118. A polarization separator 120 is used to separate beams 116 and 118 and direct them for individual monitoring. For example, each beam 116, 118 can be sent to a separate filter 30 of OCM 10.

Figure 9:
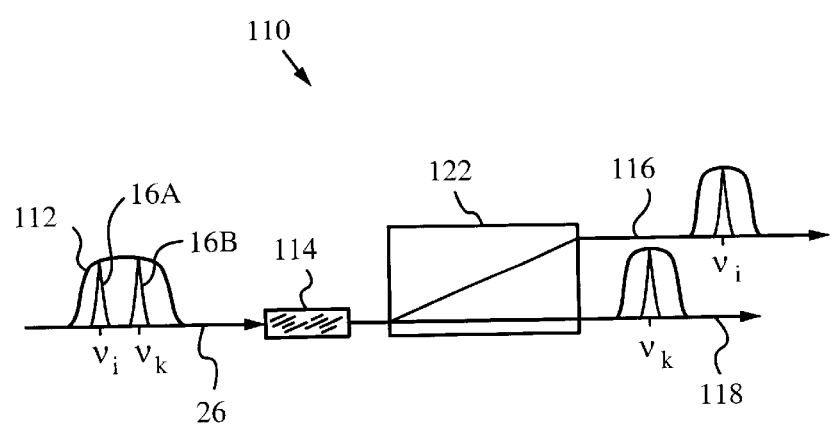
FIG. 9 shows a portion of yet another OCM or filter in accordance with the invention.

FIG. 9 illustrates a portion of yet an alternative embodiment of OCM 110 employing a polarization walk-off element 122 to separate beams 116 and 118. The use of walk-off element 122 allows one to use birefringent element 30 of OCM 10 for filtering both beams 116 and 118, i.e., birefringent element 30 can be shared in this embodiment. It should be noted that any it of the above-described embodiments can take advantage of polarization walk-off elements like 122 to conserve space and permit the OCM or filter to be integrated into a smaller package. In fact, a person skilled in the art will recognize that many extensions and alternative embodiments of the invention are possible and that the full breadth of the invention is hence defined by the scope of the appended claims and their legal equivalents.

I claim:

1. An optical channel monitor for analyzing an incident light comprising narrow band signal channels, said optical channel monitor comprising:
   a) an acousto-optic tunable filter for refracting from said incident light a refracted light comprising a test channel having a center frequency $v_0$, said test channel being selected from said narrow band signal channels;
   b) a first birefringent element for filtering from said refracted light a first polarized light and a second polarized light orthogonal to said first polarized light, such that transmissions of said first polarized light and said second polarized light are substantially equal at said center frequency $v_0$;
   c) a second birefringent element for filtering from said first polarized light a first polarized portion and a second polarized portion orthogonal to said first polarized portion, such that transmissions of said first polarized portion and said second polarized portion are substantially equal at a first offset $\delta_1 v$ from said center frequency $v_0$;
   d) a set of photodetectors for measuring intensities of said first polarized light, said first filtered portion and said second filtered portion; and
   e) an analyzing means for deriving from said intensities said center frequency $v_0$, total intensity and a bandwidth $\Delta v_0$ of said test channel.

2. The optical channel monitor of claim 1, further comprising a first polarization separator for directing said first polarized light to said second birefringent element.

3. The optical spectrum analyzer of claim 2, further comprising a second polarization separator for directing said first polarized portion and said second polarized portion to a first pair of photodetectors belonging to said set of photodetectors.

4. The optical channel monitor of claim 2, further comprising a third birefringent element for filtering from said second polarized light a third polarized portion and a fourth polarized portion orthogonal to said third polarized portion, such that transmissions of said third polarized portion and said fourth polarized portion are substantially equal at a second offset $\delta_2 v$ from said center frequency $v_0$.

5. The optical channel monitor of claim 4, further comprising a third polarization separator for directing said third polarized portion and said fourth polarized portion to a second pair of photodetectors belonging to said set of photodetectors.

6. The optical channel monitor of claim 2, wherein said first polarization separator directs said second polarized light to a photodetector belonging to said set of photodetectors.

7. The optical channel monitor of claim 1, wherein said narrow band signal channels comprise communication channels selected from the group consisting of Wavelength Division Multiplexed channels and Dense Wavelength Division Multiplexed channels.

8. An optical filter for filtering an incident light comprising narrow band signal channels, said optical filter comprising:
   a) an acousto-optic tunable filter for refracting from said incident light a refracted light comprising a test channel having a center frequency $v_0$, said test channel being selected from said narrow band signal channels;
   b) a first birefringent element for filtering from said refracted light a first polarized light and a second polarized light orthogonal to said first polarized light, such that transmissions of said first polarized light and said second polarized light are substantially equal at said center frequency $v_0$;
   c) a second birefringent element for filtering from said first polarized light a first polarized portion and a second polarized portion orthogonal to said first polarized portion, such that transmissions of said first polarized portion and said second polarized portion are substantially equal at a first offset $\delta_1 v$ from said center frequency $v_0$;
   d) a set of photodetectors for measuring intensities of said first polarized light, said first filtered portion and said second filtered portion; and
   e) an analyzing means for deriving from said intensities said center frequency $v_0$ and a bandwidth $\Delta v_0$ of said test channel.

9. The optical filter of claim 8, further comprising a first polarization separator for directing said first polarized light to said second birefringent element.

10. The optical filter of claim 9, further comprising a second polarization separator for directing said first polarized portion and said second polarized portion to a first pair of photodetectors belonging to said set of photodetectors.

11. The optical filter of claim 10, further comprising a third birefringent element for filtering from said second polarized light a third polarized portion and a fourth polarized portion orthogonal to said third polarized portion, such that transmissions of said third polarized portion and said fourth polarized portion are substantially equal at a second offset $\delta_2 v$ from said center frequency $v_0$.

12. The optical filter of claim 11, further comprising a third polarization separator for directing said third polarized portion and said fourth polarized portion to a second pair of photodetectors belonging to said set of photodetectors.

13. The optical filter of claim 9, wherein said first polarization separator directs said second polarized light to a photodetector belonging to said set of photodetectors.

14. The optical filter of claim 9, wherein said first polarization separator is selected from the group consisting of polarization walk-off elements and polarization beam splitters.

15. The optical filter of claim 8, wherein said narrow band signal channels comprise communication channels selected from the group consisting of Wavelength Division Multiplexed channels and Dense Wavelength Division Multiplexed channels.

* * * * *